United States Patent
Ito et al.

(10) Patent No.: US 8,638,482 B2
(45) Date of Patent: Jan. 28, 2014

(54) IMAGE PROCESSING APPARATUS FOR EXTRACTING INFORMATION ADDED TO AN ORIGINAL IMAGE AND DATA PROCESSING METHOD THEREFOR

(75) Inventors: Naoki Ito, Tokyo (JP); Yoichi Kashibuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 12/718,876

(22) Filed: Mar. 5, 2010

(65) Prior Publication Data
US 2010/0231996 A1    Sep. 16, 2010

(30) Foreign Application Priority Data

Mar. 10, 2009  (JP) ................................. 2009-056315

(51) Int. Cl.
*H04N 1/46*        (2006.01)
*G06K 9/00*        (2006.01)

(52) U.S. Cl.
USPC ........... 358/530; 358/1.9; 358/1.15; 358/538; 382/162; 382/163

(58) Field of Classification Search
None
See application file for complete search history.

(56) References Cited

U.S. PATENT DOCUMENTS

| 5,010,580 A * | 4/1991 | Vincent et al. ................ 382/163 |
| 6,381,030 B1 * | 4/2002 | Udagawa et al. ............ 358/1.14 |
| 2006/0215219 A1 * | 9/2006 | Yorimoto et al. ............ 358/1.15 |
| 2007/0280709 A1 * | 12/2007 | Higashiuchi et al. .......... 399/43 |
| 2008/0273746 A1 * | 11/2008 | Minamino .................... 382/100 |

FOREIGN PATENT DOCUMENTS

| JP | 2006-080856 | * | 3/2006 |
| JP | 2008-145611 |   | 6/2008 |
| JP | 2008-219210 A |   | 9/2008 |

* cited by examiner

*Primary Examiner* — Steven Kau

(74) *Attorney, Agent, or Firm* — Canon USA Inc. IP Division

(57) ABSTRACT

An image forming apparatus, configured to extract additional information added to an original document and perform a processing according to a result of the extraction, inputs image data obtained by causing a scanner to read an image of the original document, converts color component of the input image data into a color component different from the color component of the additional information, and causes a printer to print image data having the converted color component as a document to which a user can add additional information.

10 Claims, 6 Drawing Sheets

FIG.2A

Bill Statement

MONTH   DATE   YEAR
Bill No.

Messrs _____

Mr. _____

You are kindly requested to pay the following amounts.

XXX Company, Ltd.
Person In Charge:
Address: 11-11, XXX-11 Chome, XXX-Ku, Tokyo, Japan

TEL:           FAX:

| Subject | |
|---|---|
| Total Amount | YEN |

Payment to:   Bank,       Office
  Saving or Charging Account No.
Payment Terms

| Code | Items & Abstract | Quantity | Unit | Unit Price | Amount |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  | Subtotal |  |
|  |  |  |  | Consumption Tax |  |
|  |  |  |  | Total Amount |  |
| Remarks |  |  |  |  |  |

| Seal | Seal | Seal |
|---|---|---|

XXX Company, Ltd.

FIG.2B

Bill Statement

MONTH  DATE  YEAR
Bill No.

Messrs _____

Mr. _____

You are kindly requested to pay the following amounts.

XXX Company, Ltd.
Person In Charge:
Address: 11-11, XXX-11 Chome, XXX-Ku, Tokyo, Japan

TEL:            FAX:

| Subject | |  — 31
|---|---|
| Total Amount | YEN |

— 32

Payment to:   Bank,        Office
Saving or Charging Account No.
Payment Terms

| Code | Items & Abstract | Quantity | Unit | Unit Price | Amount |
|---|---|---|---|---|---|
| | | | | | |
| | | | | | |
| | | | | | |
| | | | | | |
| | | | | | |
| | | | | | |
| | | | | | |
| | | | | | |
| | | | | Subtotal | |
| | | | | Consumption Tax | |
| | | | | Total Amount | |

| Remarks | |
|---|---|

Seal | Seal | Seal  — 33

XXX Company, Ltd.

FIG.2C

Bill Statement

MONTH　DATE　YEAR
Bill No.

Messrs _____

Mr. _____

You are kindly requested to
pay the following amounts.

XXX Company, Ltd.
Person In Charge:
Address: 11-11, XXX-11 Chome, XXX-Ku, Tokyo, Japan

TEL:　　　　　FAX:

| Subject | |
|---|---|
| Total Amount | *100,000,000* YEN |

— 41
— 42

Payment to:　Bank,　　Office
　　　　Saving or Charging Account No.
Payment Terms

| Code | Items & Abstract | Quantity | Unit | Unit Price | Amount |
|---|---|---|---|---|---|
| A1 | # $ % & | 3 | CASE | 500,000 | 1,500,000 |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  | Subtotal |  |
|  |  |  |  | Consumption Tax |  |
|  |  |  |  | Total Amount |  |

| Remarks | |
|---|---|

| Seal | Seal | Seal |
|---|---|---|

— 43

XXX Company, Ltd.

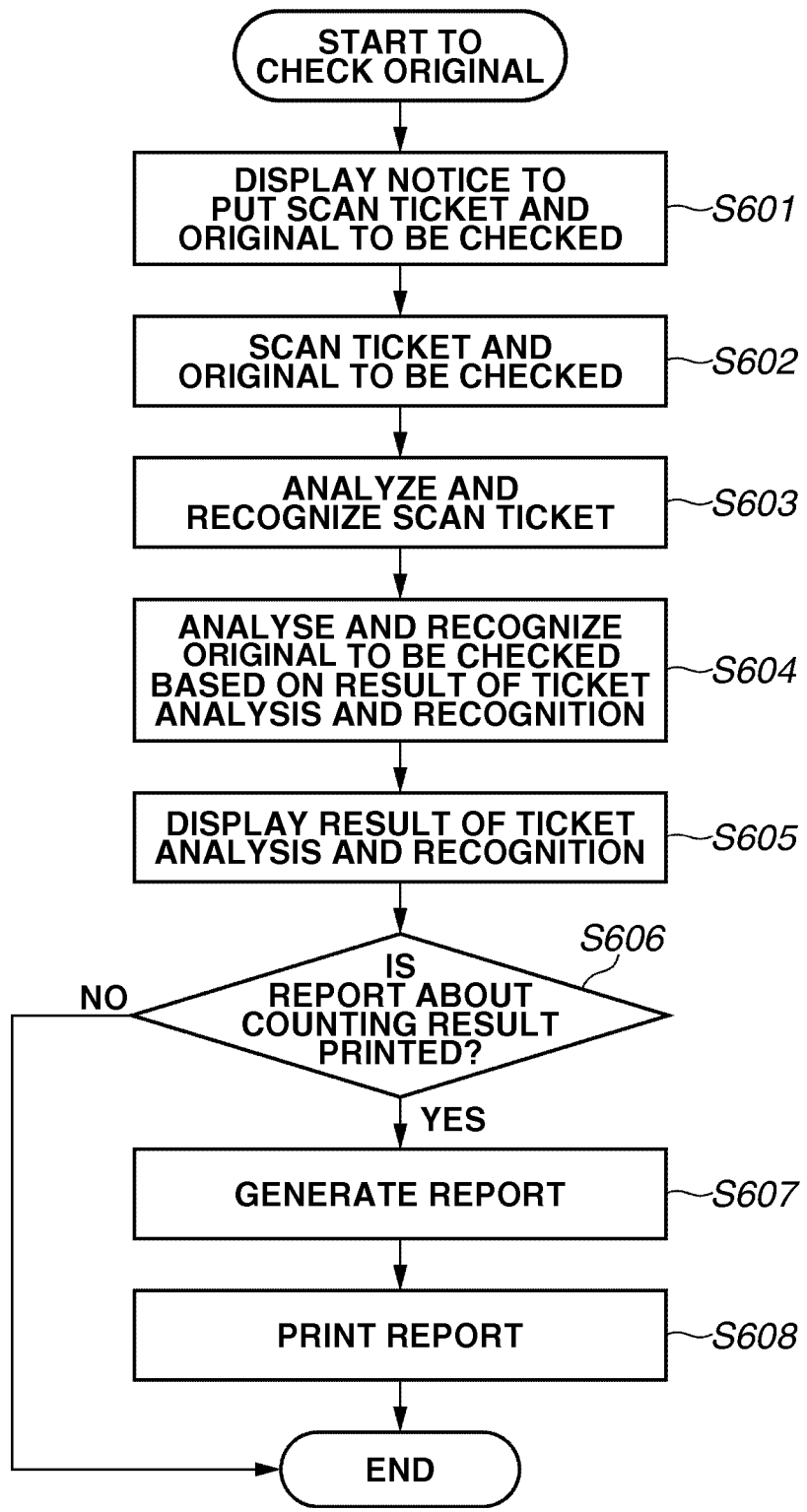

IMAGE PROCESSING APPARATUS FOR EXTRACTING INFORMATION ADDED TO AN ORIGINAL IMAGE AND DATA PROCESSING METHOD THEREFOR

BACKGROUND OF THE INVENTION

1. Field of the Invention

The present invention relates to an image processing apparatus capable of extracting additional information added to an original and performing processing according to the extracted information.

2. Description of the Related Art

There has been a well-known technology for reading an original document, such as a form, by a scanner, and extracting information, such as amounts of money or dates written on the document. This technology makes it easy to utilize data extracted from a plurality of forms for aggregate calculation of thereof. However, to automate processing such as aggregate calculation, it is necessary to recognize what data is located in where in a form.

For example, Japanese Patent Application Laid-Open No. 2008-145611 discusses a technology in which a user handwrites processing instruction information indicating a processing object area and a processing content in an original document (processing object), and when the scanner reads this information, the processing object area and the content of processing are determined.

However, in Japanese Patent Application Laid-Open No. 2008-145611, it is assumed that an original document sheet is black and instructions are written with a red pen, and therefore if a colored sheet other than black is used, the instruction may be recognized incorrectly. In other words, when the color included in a sheet is similar to the color of a pen used for writing the instructions, the written contents may not be recognized correctly.

SUMMARY OF THE INVENTION

The present invention is directed to an image processing apparatus, a control method, and a program capable of reducing recognition errors of additional information when the additional information added to an original document is extracted and processing is performed according to an extraction result.

According to an aspect of the present invention, an image processing apparatus configured to extract additional information added to an original document and perform a processing according to a result of extraction. The image processing apparatus includes an input unit configured to input document image data obtained by causing a reading unit to read an image of a unit original document and, a conversion unit configured to convert color components of document image data input from the input unit into color components different from color components of the additional information, and a control unit configured to cause a printing unit to print the image data with its color components converted by the conversion unit as a document which a user uses to add additional information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C illustrate examples of an original document as a processing object according to an exemplary embodiment of the present invention.

FIG. 4 is a flowchart illustrating a flow of a process for checking an original document according to an exemplary embodiment of the present invention.

DESCRIPTION OF THE EMBODIMENTS

Various exemplary embodiments, features, and aspects of the invention will be described in detail below with reference to the drawings.

Figure 1:
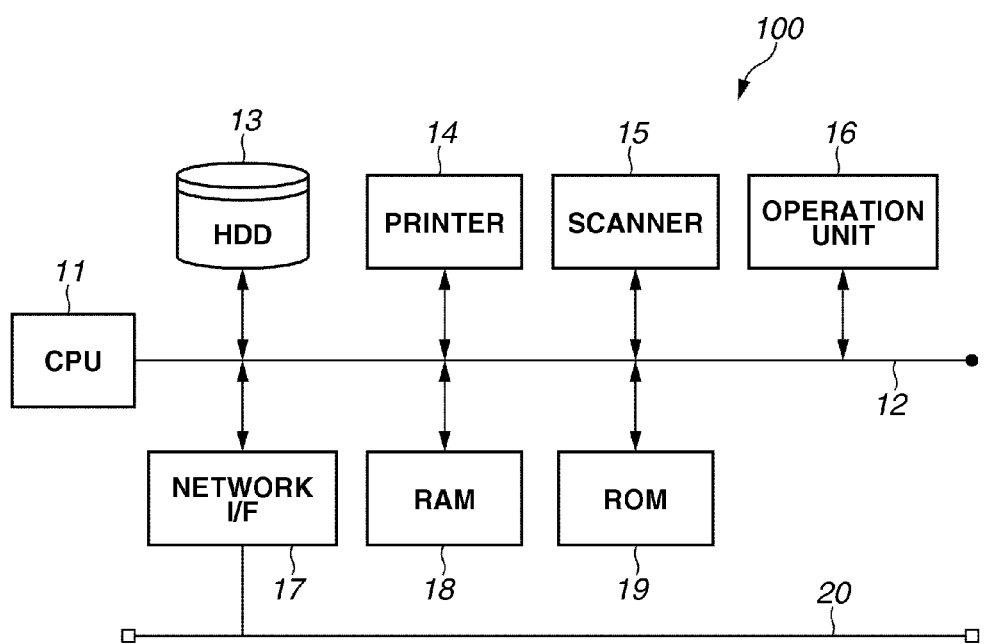
FIG. 1 is a block diagram illustrating a configuration of an image processing apparatus according to an exemplary embodiment of the present invention.

FIG. 1 is a block diagram illustrating an example configuration of an image processing apparatus according to an exemplary embodiment of the present invention. An image forming apparatus 100 according to the present exemplary embodiment is a multifunction peripheral having various functions, such as a copy function and a scanner function. But, those functions may be implemented by using a plurality of machines.

A CPU 11 controls the operation of the entire image processing apparatus 100 by loading a program stored in a ROM 19 into a RAM 18. The CPU 11 communicates with other units in the image forming apparatus 100 via a bus 12.

An operation unit 16 includes a plurality of keys that a user uses to issue instructions, and a display unit to display various items of information to be provided for the user. A scanner 15 as a reading unit reads a color image of a document set on a document positioning plate by the user, and obtained electronic data (image data) is stored in an HDD 13 or RAM 18.

The HDD 13 is a hard disk drive including a hard disk, and stores various input items of information. The scanner 15 includes a document feeding unit, and can read a document by sequentially feeding a plurality of documents from the document feeding unit to the document positioning plate.

A printer 14 prints an image on a recording sheet based on input image data. A network I/F 17 connects the image processing apparatus 100 to a network 20, and controls exchange of data with external devices on the network.

In the present exemplary embodiment, a case is described in which a processing to be discussed later is performed on image data input by the scanner 15, but the processing can be equally carried out on image data when image data of a document from an external device is input via the network I/F 17, for example. This processing also can be performed in a personal computer (PC) connected with a scanner or a printer.

In this case, all or a part of programs used in the present exemplary embodiment can be provided to the PC via the network, and also can be stored in a recording medium, such as a CD-ROM, and supplied to the PC.

An example of an original document used in the present exemplary embodiment is described. FIG. 2A illustrates an example of a form as a document used in the present exemplary embodiment.

This document is a bill statement in a blank state, i.e., a user has not written anything (before processing instruction information to be described later is added). This bill statement includes areas for an addressee company name, a person in charge at the addressee, a subject, a total amount, product names, quantities, unit, unit prices, amounts, information about the bank to transfer to, subtotals, taxes, such as consumption tax, remarks, and an issuer's seal. The areas to which the user enters information when the bill statement is issued officially include a subject, product names, quantities, unit, unit prices, amounts, and an issuer's seal.

In the present exemplary embodiment, out of the areas in this bill statement, the specified areas are checked to see if information has been added in the areas designated by the user, and the other areas are checked to see if they are left vacant designated by the user.

FIG. 2B illustrates a case where out of the items in a document illustrated in FIG. 2A, those optional areas, which are to be checked by the user, are additionally marked by a color pen. In this manner, a document in FIG. 2B is made to be a processing instruction sheet.

A processing instruction sheet is generated when a user, who checks a filled-out bill statement, writes processing instruction information, which is described later, in a sheet of the same format as a checking-object bill statement. In other words, a bill statement illustrated in FIG. 2A becomes a processing instruction sheet when the processing instruction information is added to the bill statement. In the present exemplary embodiment, to specify a processing object area, the user marks off a rectangular area with a color pen, for example.

The processing instruction information (additional information) is described below. In FIG. 2B, an area 31 is an area enclosed by a line drawn with a blue pen, an area 32 is an area enclosed by a line drawn with a green pen, and an area 33 is an area enclosed by a line drawn with a red pen.

Colors, other than those colors described above, may be used, and the number of colors is not limited to the three colors, but may be increased or decreased according to checking contents. Though color pens are used here, any tools that can paint in colors may be used.

As processing instruction information, the user previously registers colors and processing contents associated with each other on a one-to-one correspondence basis in the RAM 18 from the operation unit 16. More specifically, the processing instruction information is registered in the RAM 18, in which the blue color specifies an area to be checked to see if the area is blank, the green color specifies an area to be checked to see if information is written, and the red color specifies an area to be checked to see if a seal or a signature is affixed.

The CPU 11 determines color components (e.g., hue) of each of registered colors, and stores the contents of color registration in the RAM 18. Instead of registration by using the operation unit 16, colors maybe registered by causing the scanner 15 to read a form in which color data is written.

Instead of color registration by the user, colors maybe previously registered in the image processing apparatus 100. When the registered contents are used, the user adds processing instruction information to a form of a document according to the registered colors and the processing contents.

The user has registered color components to be used and corresponding processing instruction information in advance, and then generates a processing instruction sheet according to the registered data. By using this processing instruction sheet, the image processing apparatus 100 extracts the processing instruction information, recognizes processing contents according to the extracted information, and thereby checks a checking object document to confirm if information exists in specific areas, if a specified area is blank, or if a seal (or a signature) is affixed to a specified area.

FIG. 2C illustrates an example of a checking object document used in the present exemplary embodiment. The checking object document is assumed to have the same format as the documents in FIGS. 2A and 2B. In the present exemplary embodiment, as illustrated in FIG. 2B, the image processing apparatus 100 extracts added processing instruction information, and determines based on extracted data that the checking object document is correct by checking whether there is no entry, namely, blank in the area 41, information is entered in the area 42, and a seal is affixed to the area 43.

FIG. 2C illustrates a case where all conditions for determining that the document is correct are satisfied, and the check result is "correct". If there is at least one area where the condition for determining that the document is "correct" is not satisfied, the check result is "NG". However, the contents of checks and the areas are not limited to those described above, but may be other kinds of checks and may be other areas.

A process for generating a scan ticket, by which a check of written contents of a document is performed according to the processing instruction sheet that is illustrated in FIG. 2B, is described below. A scan ticket indicates instruction contents in FIG. 2B and indicates a method of checking a checking object document illustrated in FIG. 2C in a format (e.g., Quick Response (QR)) recognizable by the image processing apparatus 100. A scan ticket includes instruction contents recognized from a document in FIG. 2B and position information about areas to which the instruction contents are applied.

When the image processing apparatus 100 checks a checking object document, the scanner 15 reads a scan ticket, and the CPU 11 recognizes the processing instruction from a read image, and the CPU 11 checks the checking object document according to the processing contents.

Figure 3:
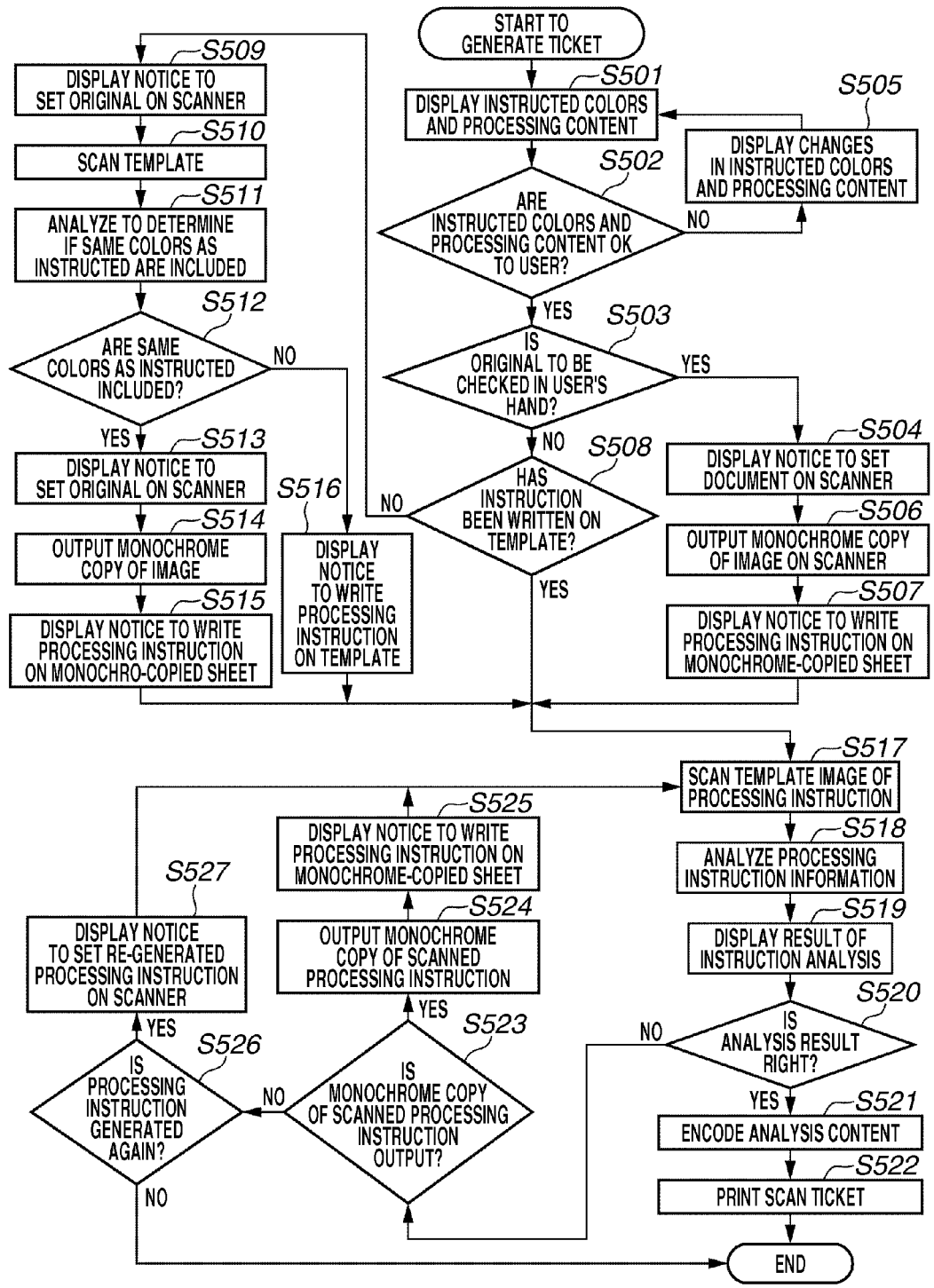
FIG. 3 is a flowchart illustrating a flow of a process of generating a scan ticket according to an exemplary embodiment of the present invention.

FIG. 3 is a flowchart illustrating the flow of a process for generating a scan ticket according to the present exemplary embodiment. This flowchart illustrates the flow of a process that is executed by the CPU 11 by loading a program from the ROM 19 into the RAM 18 and executing the program.

This flow is started when the user instructs via the operation unit 16 to generate a scan ticket. When the flow starts, in step S501, the CPU 11 controls the operation unit to display a combination of a color and a corresponding processing content in the processing instruction information stored in the RAM 18 (hereafter referred to simply as an instruction color).

For example, notices are displayed as follows: "This is "OK" if a seal or a signature is affixed in the area surrounded by red.", "This is "OK" if the area surrounded by blue is blank.", or "This is "OK" if information is written in the area surrounded by green."

In step S502, the CPU 11 further causes the operation unit 16 to display inquiry of whether the instruction color and the processing content displayed in step S501 are all right with the user.

In response to inquiry received in step S502, if it is determined that a negative answer has been returned from the user via the operation unit 16 (NO in step S502), the CPU 11 controls the operation unit 16 to display that the combination of the instruction color and the processing content will be changed in step S505.

Then, inquiry about which color is changed may be displayed, and the image processing apparatus 110 may propose a new candidate color to replace the instruction color to be changed, or the user may specify an arbitrary new color via the operation unit 16.

Instead of changing the colors, simply the combinations may be changed between the color and the processing content. In this case, since the same color cannot be associated with a plurality of processing contents, the CPU 11 controls so that the colors and processing contents are associated on a one-to-one correspondence basis.

When, in step S505, either an instruction color or a processing content is changed, or both an instruction color and a processing content are changed, the CPU 11 controls the operation unit 16 to display combinations of the instruction colors and the processing contents in step S501. The display is performed so that the user can confirm changes made in step S505.

In response to inquiry in step S502, if it is determined that a positive answer has been returned from the user via the operation unit 16 (YES in step S502), the CPU 11 determines the instruction colors and the corresponding processing contents to be used as processing instruction information, and registers the processing instruction information in the RAM 18.

The determination in step S502 is made to prevent extraction errors of the processing instruction information. When the user is made to visually confirm the contents of a document (the colors included in the document), and if the color components of the instruction colors are similar to the color components of the document, the user is urged to change them.

As a result of confirmation in step S502, if it is determined that the color components of the instruction colors are similar to the color components of the document, a monochrome copy of the original is made as described below. In this case, CPU 11 causes the operation unit 16 to display a notice to prompt setting of the original. When the CPU 11 determines that the user has set the original document, monochrome copying is performed.

Even by making such an arrangement, it is possible to prevent extraction errors of processing instruction information when the processing instruction information is added to a document with a chromatic color pen. By making a decision based on a result of confirmation by the user, the number of times a document is read by the scanner 15 can be reduced.

If, in step S502, it is determined that the instruction colors and the processing contents are OK with the user (YES in step S502), the CPU 11 identifies and stores in the RAM 18 the color components to be used as processing instruction information.

Next, in step S503, the CPU 11 controls the operation unit 16 to display inquiry of whether only a checking object document (illustrated in FIG. 2C, for example) exists in the user's hand. This inquiry is made to confirm whether there is a template (as illustrated in FIG. 2A, for example) for use in writing a processing instruction sheet or a processing instruction sheet (as illustrated in FIG. 2B, for example).

In other words, the above inquiry is made to enable a template to be generated for use in preparing a processing instruction sheet from a checking object document when the user has only a checking object document in his hand. A template is not a formal checking object document, but is a checking object document to which the user can fill the processing instruction information.

When, in step S503, when receiving a reply via the operation unit 16 that the user has only a checking object document in his hand (no document that can be used as a template) (YES in step S503), the CPU 11 causes the operation unit 16 to display a notice prompting that the user should set a checking object document on the scanner 15.

The operation unit 16 displays a notice "Please set a sheet of the checking object document on the scanner. After the document is set, please press the OK button.". The OK button is displayed to be used for confirming that the document is set.

It is arranged so that when the OK button is pressed, the CPU 11 recognizes that the document is set. However, a photo interrupter provided at a lower portion of the document positioning plate or a document sensor of the document feeding unit may be used to automatically recognize the presence of a document on the scanner 15.

After determining the presence of a document in step S504, the CPU 11 controls the scanner 15 to read an image of the document as the checking object in step S506. Subsequently, the CPU 11 converts image data input by the scanner 15 into monochrome image data, and outputs the monochrome image data to the printer 14 to be printed on a recording sheet as a monochrome copy in step S506.

In step S506, the document is converted into monochrome image and printed by the printer 14, but the printing process is not limited to this method. The colors of a captured image of a document may be converted into other colors not including the instruction colors, and printed on a sheet by the printer 14.

For example, red letters in a read document may be converted into blue letters, and output on a sheet. Alternatively, the colors that should be changed in color may be registered in the RAM 18, and when there exists the same color as a registered color in a document, the color may be converted.

Then, in step S507, the CPU 11 controls the operation unit 16 to display a notice prompting the user to write processing instruction information in a recording sheet output by the printer 14 in step S506.

If, in step S503, a reply has been returned from the user that there exists a template or a processing instruction sheet, the CPU 11 displays a notice inquiring the user if processing instruction information has already been written in the template (or if there is a processing instruction sheet) in step S508.

When a reply to the above notice is received via the operation unit 16 to the effect that instruction information has not been written on the template (NO in step S508), the CPU 11 causes the operation unit 16 to display a notice urging the user to set the template on the scanner 15 in step S509.

For example, a notice saying "Please set a template on the scanner. After the template is set, please press the OK button", and an "OK" button are displayed. When the OK button is pressed, the CPU 11 recognizes that the template has been set in the present exemplary embodiment. However, the photo interrupter provided at a lower portion of the document positioning plate or the document sensor of the document feeding unit may be used to automatically recognize the presence of a document on the scanner 15.

After determining the presence of a document in step S509, the CPU 11 causes the scanner 15 to read an image of the document serving as a template in step S510. Regarding image data obtained as described, in step S511, the CPU performs an analyzing and recognizing process to determine whether the image data includes color components that are the same as the instruction colors.

In the analyzing and recognizing process of the color components, in order to analyze and recognize whether the image data includes a red, for example, the CPU 11 extracts hues of red for analysis and recognition. A well-known method can be adopted for analysis and recognition of color components. Another parameter other than hue may be used, or hue and another parameter may be used in combination.

In step S512, the CPU 11 determines whether a color that is the same as an instruction color registered in the RAM 18 is included in the colors analyzed and recognized in step S511. In determining whether an instruction color is the same as the color analyzed and recognized in step S511, the two colors need not be perfectly matched, but may be determined to be the same if they fall within an allowable range.

For example, if RGB values are expressed in 256 stages, when a color of an RGB value is compared with an RGB value of an instruction color and a difference is within ±20, the two colors maybe determined to be the same. Another method by which two colors are determined to be the same may be adopted.

If it is determined in step S512 that the same color as an instruction color registered in the RAM 19 is included in the image data in the template (YES in step S512), the CPU 11 causes the operation unit 16 to display a notice prompting the user to set a template on the scanner 15 in step S513.

For example, a notice saying "Please set a template on the scanner. After the template is set, please press the OK button." and the "OK" button is displayed. When the OK button is pressed, the CPU 11 recognizes that the template is set. However, the photo interrupter provided at a lower position of the document positioning plate or the document sensor of the document feeding unit may be used to automatically recognize the presence of a template on the scanner 15.

After determining the presence of a template in step S513, the CPU 11 causes the scanner 15 to read an image of the document serving as a checking object in step S514. The CPU 11 converts the image data input from the scanner 15 into monochrome image data, and outputs the monochrome image data to the printer and the monochrome image data is printed on a recording sheet as a monochrome copy.

In step S514, the document is converted into monochrome image, and printed by the printer 14, but the printing process is not limited to this. As an alternative method, various methods may be adopted as described above in step S506.

Then, in step S515, the CPU 11 causes the operation unit 16 to display a notice for prompting the user to write processing instruction information as illustrated in FIG. 2B on a recording sheet output by the printer 14 in step S514.

If it is determined, in step S512, that the same color as the instruction color registered in the RAM 19 is not included in the image of the template (NO in step S512), the CPU 11 causes the operation unit 16 to display a notice for prompting the user to write processing instruction information as illustrated in FIG. 2B in the document of the template in step S516.

In step S508, the CPU 11 causes the operation unit 16 to display a notice for confirming whether processing instruction information has been written in the template. When it is determined the that a reply has been received via the operation unit 16, which indicates that processing instruction information has been written in the template (in other words, a processing instruction sheet has been completed) (YES in step S508), the CPU 11 causes the scanner 15 to read an image of the template on which the processing instruction sheet has been written in step S517.

More specifically, the CPU 11 causes the operation unit 16 to display a notice for prompting the user to set the template on the scanner 15, and in response to this, when the user sets a document (a processing instruction sheet) on the scanner 15 and presses the OK button, the PCU 11 causes the scanner 15 to read the document.

However, the CPU 11 does not converts the image data read by the scanner 15 into monochrome image data. The obtained image data is stored in the RAM 18.

Next, the CPU 11 performs an analyzing and recognizing process of processing instruction information from image data input from the scanner 15 in step S518. In step S518, the CPU 11 first analyzes where in the document one or more instruction colors determined in step S502 exist, and then recognizes the areas where the instruction colors exist and what colors the areas are, and thereby specifies the positions of the areas for each color.

The specified positions include information indicating the positions and size of the processing object areas. The positions are specified in coordinates, for example. The specified positions and processing contents determined in step S502 are associated with each other and stored in the RAM 18.

Then, in step S519, the CPU 11 causes the operation unit 16 to display the analysis and recognition results executed in step S518. For example, the coordinates of the areas corresponding to the specified items of processing instruction information are displayed. Thumbnail images of read document may be displayed for illustrating in which positions the specified items of processing instruction information exist associated with those images and in such a manner that the corresponding processing contents can be known.

In step S520, the CPU 11 causes the operation unit 16 to display a notice for prompting the user to confirm whether the contents displayed in step S519 are correct. If a negative reply in response to the above confirmation is returned by the user via the operation unit 16 (NO in step S520), the CPU 11 causes the operation unit 16 to display a screen for confirming whether the image of the document read by the scanner 15 in step S517 is printed out in a monochrome copy by the printer 14 in step S523.

When a positive reply is received via the operation unit 16 (YES in step S523), the CPU 11 converts image data of the document read by the scanner 15 in step 517, and causes the printer 14 to output a monochrome copy in step S524.

In other words, if the processing instruction information could not be extracted correctly, the printer 14 produces a monochrome copy of a processing instruction sheet to which the processing instruction information is added, and processing instruction information is added to this monochrome copy.

In step S524, the document is converted into monochrome image data and the printer 14 prints it out, but it is not limited to this. Various methods, such as the one described in step S506, may be adopted.

In step S525, the CPU 11 controls the operation unit 16 to display a notice for prompting the user to write the processing instruction information on a recording sheet output by the printer 14 in step S524.

When an instruction not to output a monochrome copy is received from the user via the operation unit 16 (NO in step S523), the CPU 11 controls the operation unit 16 to display a notice for prompting the user to confirm whether to generate a processing instruction sheet anew in step S526.

In response to this notice of inquiry, when an instruction to generate a processing instruction sheet is received via the operation unit 16 (YES in step S526), the CPU 11 controls the operation unit 16 to display a notice for prompting the user to set a newly generated processing instruction sheet on the scanner 15 in step S527.

On the other hand, in response to the inquiry in step S526, when an instruction not to generate the processing instruction sheet anew is received via the operation unit 16 (NO in step S526), this process is finished.

In succession to the display in step S525 or S527, when the user sets a document and the "OK" button is pressed via the operation unit 16, that is, an instruction to read the document is issued, the process in step S517 described above is carried out again.

When a reply indicating that an analysis result in step S520 is right is received via the operation unit 16 (YES in step S520), the CPU 11 stores the content of the analysis as an extraction result of the processing instruction information in the RAM 18. Then, the CPU 11 codes the content of analysis in step S521.

Coding of a content of analysis is to code a result of analysis displayed in step S519 by using a two-dimensional code (QR code), for example. A coded content includes an area as a processing object and a processing content to be carried out on the area.

Coding is performed by using a two-dimensional code as an example in the present exemplary embodiment, but the coding method is not limited to a two-dimensional code and coding may be performed by using some other method so long as the code is readable to the image processing apparatus 100 for the analyzing and recognizing process. The CPU 11 the printer 14 to print out the content of analysis coded in step S521, on a recording sheet in step S522 serving as a scan ticket.

By using a printed scan ticket, a checking object document can be checked. However, when it is determined that the analysis result is correct (YES in step S520), since this means that the processing instruction sheet read by the scanner 15 in step S517 is recognized correctly, this processing instruction sheet may be used as a scan ticket without performing processing in steps S521 and S522. In this case, the processing contents are to be recognized from the processing instruction sheet when the document is checked.

With the processing described above, by converting the color components included in a document into color components different from the instruction colors, a document designed for the user to add processing instruction information can be printed. Thereby, processing instruction information added to a processing instruction sheet can be recognized correctly. In other words, errors in recognizing processing instruction information can be reduced.

Since it is possible to give the user appropriate guidance for necessary operation (a notice for prompting the user to produce a monochrome copy, for example), operation errors by the user can be reduced. All processing steps illustrated in the flowchart described above need not be executed, but only a part of thee steps may be executed.

A procedure of checking a document according to processing instruction information extracted by using a scan thicket generated as described above.

FIG. 4 is a flowchart illustrating a flow of processing steps to check a checking object document by using a scan ticket. This flowchart illustrates steps that the CPU 11 executes by reading a program from the ROM 19 and loading the program into the RAM 18.

The flowchart starts to proceed when the user issues via the operation unit 16 an instruction to check a checking object document When the flowchart starts, in step S601, the CPU 11 controls the operation unit 16 to display a notice for prompting the user to superpose a checking object document on a first scan ticket printed in step S522, and set the scan ticket and the checking object document together on the document feeding unit.

After the document is set, when the OK button on the operation unit 16 is pressed and thus reading a document is instructed, the CPU 11 controls the scanner 15 to start reading documents by feeding the sheets set in the document feeding unit in step S602. At this point, out of the documents in the document feeding unit, a scan ticket as the first document is fed and read by the scanner 15.

Subsequently, the checking object documents stacked on the scan ticket are read successively. In this case, a plurality of checking object documents can be stacked when they are set. By specifying a plurality of documents as a series of documents via the operation unit 16, a plurality of sheets can be set in the document feeding unit in a state in which the plurality of documents are separated in a plurality of bunches of sheets.

In step S603, the CPU 11 performs the analyzing and recognizing process of image of the first document read in step 602, that is, the scan ticket. The CPU 11 analyzes a two-dimensional code in a read scan ticket, recognizes an area (position) as an object of a processing instruction and a content of the processing, and stores a recognition result in the RAM 18.

Then, in step S604, the CPU 11 performs an analyzing and recognizing process of checking object documents of the second sheet and the subsequent sheets by using the recognition result stored in the RAM 18. For example, in the case of FIG. 2C, the CPU 11 recognizes that the area 41 is normal when it is blank, the area 42 is normal when something is written, and the area 43 is normal when a seal or a signature is affixed to this area The above recognition is performed by comparing the image of the area 41 with a predetermined threshold value. More specifically, if the number of white pixels (no image) of the area occupies more than 80 percent of the area, the area is recognized as blank. Image of the area 42 is subjected to a digitizing process by comparing with another predetermined threshold value, and if the number of black pixels (i.e., image is present) occupies more than 20 percent of the area, the area is recognized as having data written therein.

Red or hues close to red are extracted from the image of the area 43 and the extracted reddish hues are subjected to a digitizing process, and if the proportion of the presence of the red hue pixels is more than 20 percent in the area 43, then the area 43 is recognized as having a seal or a signature affixed thereto. The numeric values representing percentages are just examples, and other values may be used, and some other method of recognition may be adopted.

The CPU 11 sequentially accumulates page numbers of the checking object documents and corresponding recognition results in the RAM 18. If all recognition results for a sheet of checking object document are normal, the document is determined to be OK. If at least one recognition result is abnormal, the document is determined to be NG.

When the recognition process for all checking object documents is completed, the CPU 11 aggregates results for all documents accumulated in the RAM 18. The aggregation of results indicates, for example, counting a total number of checking object documents that are checked, counting a number of areas determined to be NG, and counting page numbers of documents including NG-determined areas, for example.

The page numbers are counted in the order that the scanner 15 read the documents (in the order that the documents are sent out from the document feeding unit) starting with the first sheet as the first page, except for the scan ticket.

If there are items of information other than those mentioned above are distinguishable from the information accumulated in the RAM 18, those items of information may be summed up. Though information is stored in the RAM 18 in the above description, the same processing may be applied to the information if the information is stored in the HDD 13.

In step S605, the CPU 11 controls the operation unit 16 to display results of aggregation performed in step S604. For example, a total number of documents checked, the areas determined as NG if there are documents determined as NG, and the page numbers of documents determined as NG are displayed.

Together with the above display, the CPU 11 can cause the operation unit 16 to display a button to be used by the user to issue an instruction to print, and can also cause the printer 14 to output a report on aggregation results on a recording sheet.

If it is determined in step S606 that the button to issue an instruction to print a report is pressed (YES in step S606), the CPU 11 generates a report indicating the above aggregation results (in step S607).

Since printing on a recording sheet by the printer 14 can make use of a wider area than in the display on the operation unit 16, more information can be included in a report than in the display in step S605. For example, in addition to the above aggregation results, for example, reduced image of the template of the checking object document maybe printed together.

The CPU 11 causes the printer 14 to print a generated report in the form of image on a recording sheet instep S608. It is useful to print a report with information added indicating that the page has been determined to be NG.

In the above checking process, though a case where a scan ticket is used has been described, instead of using a scan ticket, a processing instruction sheet in which processing instruction information has been written may be used.

In the exemplary embodiment described above, the colors of instruction information are analyzed and recognized, but in addition to this process, another decision as to whether the color area has a rectangular area may be added to enhance the determination accuracy.

For example, after the blue area is recognized, whether the blue area is rectangular in shape (closed area) is analyzed. As for a method of analyzing a closed area, a profile line of image, containing a blue color, is traced, and the pixel that forms an apex (or apex angle) is detected, and thereby the shape of the blue area is determined to be a rectangle.

Other well-known methods for determining a rectangle may be adopted. Further, whether the area is an area of an object of a processing instruction may be determined by whether the size of the rectangular area is larger or smaller than a predetermined size.

For example, if the number of pixels of a rectangular area is larger than 128 pixels (vertical)×128 pixels (horizontal), the rectangular area can be determined as an area of an object of a processing instruction. Any other methods for determining a rectangular area can be adopted so long as the method can determine a rectangular area as an object of a processing instruction by the size. Therefore, even when there are letters of the same color in the template as an instruction color, instruction information can be determined without outputting a monochrome copy.

In the above description, a case has been illustrated where when a document contains the same color as an instruction color in processing instruction information, the image of a document is converted into a monochrome image or into colors other than the instruction colors. However, when it is determined that only a chromatic color is included in a document, the document maybe converted into a monochrome image or into some color other than the instruction color.

In this case, similar to the description above, whether a chromatic color is included can be determined by causing the scanner 15 to read the document or according to a reply received in response to an inquiry about the content of a document displayed on the operation unit 16. In this manner, a comparison process between an instruction color and a color of a document can be omitted, so that the load on the CPU can be reduced.

Various methods or combinations of various methods can be used to identify instruction information.

As described above, according to the present exemplary embodiment, by designating indication on a document (template) by handwriting with a color pen, the user can indicate the check contents for a desired document. As a result, usability is enhanced. In addition, a document to be used as a template (to allow the user to add processing instruction information) can be provided to the user in an appropriate manner.

According to the present exemplary embodiment, when additional information added to a document is extracted and processing is carried out according to an extraction result, recognition errors of additional information can be reduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-056315 filed Mar. 10, 2009, which is hereby incorporated by reference herein in its entirety.

What is claimed is:

1. An image processing apparatus configured to extract additional information added to an original document and perform processing according to a result of extraction, comprising:
   an identification unit configured to identify a color component to be used for the additional information;
   an input unit configured to input document image data obtained by causing a reading unit to read an image of an original document to which the additional information is not yet added;
   a conversion unit configured to convert a color component of the document image data input by the input unit into a color component different from the color component identified by the identification unit;
   a determination unit configured to determine whether the color component identified by the identification unit is included in the original document to which the additional information is not yet added; and
   a control unit configured to, if the determination unit determines that the identified color component is included in the original document, cause a printing unit to print the document image data of which the color component is converted by the conversion unit, as an original document to which the additional information is to be added.

2. The image processing apparatus according to claim 1, wherein the determination unit performs the determination based on the input document image data of the original document to which the additional information is not yet added.

3. The image processing apparatus according to claim 1, further comprising:
- an extraction unit configured to extract the additional information from document image data obtained by causing the reading unit to read an original document to which the additional information has been added,
- wherein, when the additional information is not extracted by the extraction unit, the control unit causes the printing unit to print the document image data of which the color component is converted by the conversion unit.

4. The image processing apparatus according to claim 1, further comprising:
- a second determination unit configured to determine whether a chromatic color is included in the original document to which the additional information is not yet added,
- wherein, when the second determination unit determines that the chromatic color is included in the original document, the control unit controls the printing unit to print the document image data of which the color component is converted by the conversion unit.

5. The image processing apparatus according to claim 1, wherein the conversion unit converts the document image data, which is input by the input unit, into monochrome image data.

6. The image processing apparatus according to claim 1, further comprising:
- a notifying unit configured to send the user a notice for prompting the user to confirm whether to print the document image data,
- wherein, when the user issues an instruction to print in response to the notice sent from the notifying unit, the control unit controls the printing unit to print the document image data of which the color component is converted by the conversion unit.

7. The image processing apparatus according to claim 1, further comprising:
- a display unit configured to, if the determination unit does not determine that the identified color component is included in the original document, display a notice for prompting a user to add the additional information to the original document read by the reading unit.

8. The image processing apparatus according to claim 7, wherein the display unit is further configured to, if the determination unit determines that the identified color component is included in the original document, display a notice for prompting the user to add the addition information to the original document printed by the printing unit.

9. A data processing method for use in an image processing apparatus configured to extract additional information added to an original document and perform processing according to a result of extraction, the method comprising:
- identifying a color component to be used as the additional information;
- inputting image data obtained by causing a reading unit to read an image of an original document to which the additional information is not yet added;
- converting a color component of the input image data into a color component different from the identified color component;
- determining whether the identified color component is included in the original document to which the additional information is not yet added; and
- controlling, if it is determined that the identified color component is included in the original document, a printing unit to print the image data of which the color component is converted, as an original document to which the additional information is to be added.

10. A non-transitory computer-readable recording medium storing a program designed to cause a computer to execute the data processing method, the data processing method comprising:
- identifying a color component to be used as additional information;
- inputting image data obtained by causing a reading unit to read an image of an original document to which the additional information is not yet added;
- converting a color component of the input image data into a color component different from the identified color component;
- determining whether the identified color component is included in the original document to which the additional information is not yet added; and
- controlling, if it is determined that the identified color component is included in the original document, a printing unit to print the image data of which the color component is converted, as an original document to which the additional information is to be added.

* * * * *